Patented Feb. 14, 1950

2,497,107

UNITED STATES PATENT OFFICE 2,497,107

PROCESS OF POLYMERIZING CONJUGATED DIENES IN THE PRESENCE OF SELECTED ALKYL ESTERS OF MERCAPTYL UNDECANOIC ACIDS AS POLYMERIZATION REGULATORS

Karl H. Weber, Washington, D. C., assignor to Armstrong Cork Company, Lancaster, Pa., a corporation of Pennsylvania No Drawing. Original application March 10, 1944, Serial No. 525,946. Divided and this application September 17, 1947, Serial No. 774,674

9 Claims. (Cl. 260—82.7)

1

This application is a division of my copending application Serial No. 525,946, filed March 10, 1944.

The present invention relates to improvements in the polymerization of open chain, aliphatic conjugated dienes containing 4 to 6 carbon atoms in aqueous emulsions and to a new polymerization regulator selected from the group consisting of the alkyl esters of 11-mercaptyl undecanoic acid and the alkyl esters of 10-mercaptyl undecanoic acid.

An open chain, aliphatic conjugated diene containing 4 to 6 carbon atoms, for example, butadiene-1.3, can be polymerized by simple heating or in an aqueous emulsion. The latter method is preferred as it yields products which more nearly resemble natural rubber. In general, such a conjugated diene is usually polymerized with a copolymerizable vinyl compound, for example, styrene, as more fully hereinafter set forth. The emulsion polymerization may result in the formation of products which are relatively dry and which more nearly resemble vulcanized natural rubber rather than unvulcanized natural rubber, with the result that the polymerization products are relatively difficult to work on the mills and the incorporation therewith of filling materials and the ingredients which are necessary for effecting vulcanization is accomplished with considerable difficulty. To overcome these and other disadvantages, it has been the practice to incorporate in the emulsion a so-called "polymerization regulator." Dodecyl mercaptan, $C_{12}H_{25}SH$, is disclosed in U. S. Patent No. 2,281,613 as such a polymerization regulator. Other mercaptans, for example, octyl mercaptan, have also been disclosed as polymerization regulators, but many of these mercaptans which have been disclosed have no substantial regulatory effect. A satisfactory polymerization regulator should produce a synthetic rubber-like material which resembles unvulcanized natural rubber in being relatively plastic, and in which vulcanizing ingredients may be readily incorporated.

While the exact effect of such regulators is obscure, I believe that they tend to give a narrower range of polymer size so that all the polymers are more nearly the same length. Further, I believe that they tend to reduce cross-linking of the polymers as is evidenced by the increased benzene or acetone solubility, though it should be understood that I do not intend to be limited to any particular theory.

It is the object of the present invention to provide new compounds which are useful polymerization regulators, which expedite polymerization of open chain, aliphatic conjugated dienes or the polymerization of such aliphatic conjugated dienes with unsaturated copolymerizable compounds containing a vinyl radical, in an aqueous emulsion without unduly retarding the course of the reaction and without involving the formation of undesirable products. Other objects of my invention will become more apparent from the following description and claims.

I have discovered that the alkyl esters of either 10 or 11-mercaptyl undecanoic acid are desirable polymerization regulators for the polymerization in aqueous emulsion of open chain, aliphatic conjugated dienes containing 4 to 6 carbon atoms. In most cases, an amount of less than about 1% of the polymerization regulator (calculated on the total weight of the monomeric polymerizable ingredients) is sufficient to exert the desired effect. In general, I have found that from about 0.3% to about 0.5% of these polymerization regulators is sufficient. Too great an amount of regulator tends to unduly slow down the rate of polymerization and too small an amount of regulator will not be sufficiently effective, though it will be understood that the amount of regulator used with a particular formulation will depend at least in part upon the materials being polymerized or copolymerized and upon the characteristics desired in the final product. The most desirable amount of polymerization regulator for any particular formulation will be readily apparent to one skilled in the art.

My polymerization regulators may be employed with any open chain, aliphatic conjugated diene containing from 4 to 6 carbon atoms; may be employed with mixtures of such dienes; or may be employed with a mixture of one or more such dienes with one or more copolymerizable compounds containing a vinyl radical. The term "open chain aliphatic conjugated diene" containing from 4 to 6 carbon atoms is intended to include butadiene-1,3 and the homologues and derivatives of butadiene-1,3 such as isoprene, 2,3 dimethyl butadiene, chloroprene, bromoprene, iodoprene, and the like.

The term "copolymerizable compound containing a vinyl radical" is intended to include all compounds containing the group $CH_2=C<$ which may be copolymerized with such a diene in an aqueous emulsion. For example, the copolymerizable compounds include styrene, alpha-methyl styrene, alpha-methyl-para-methyl styrene, acrylonitrile, methyl methacrylate, the vinyl esters of the higher fatty acids such as the vinyl esters of the acids obtainable by saponification of a drying oil, the allyl esters of the higher fatty acids, or the like, or mixtures thereof.

The polymerization regulator may be, for example, the methyl, ethyl, propyl, butyl or similar alkyl esters of 11-mercaptyl undecanoic acid or the regulator may be an alkyl ester of 10-mercaptyl undecanoic acid. Ethyl 11-mercaptyl undecanoate, $SH(CH_2)_{10}COOC_2H_5$, and ethyl 10-mercaptyl undecanoate, $$CH_3SHCH(CH_2)_8COOC_2H_5$$

have been found to be particularly desirable polymerization regulators.

My new polymerization regulators may be prepared in any suitable manner or may be prepared as hereinafter described. Unless otherwise set forth, all parts and percentages are by weight.

Hydrogen bromide was bubbled through a solution of 44.7 grams of undecylenic acid, $$CH_2=CH(CH_2)_8COOH$$

in heptane to form 43 grams of quite pure 11-bromo undecanoic acid having a melting point range of 43 to 46° C. To the solution of 32 grams of the above acid in 66 cc. of ethyl alcohol there were added 6.8 grams of potassium hydroxide and 9.2 grams of thiourea, and the solution was refluxed until a crystalline mass was formed. This crystalline mass was dissolved in 100 cc. of water containing 13.4 grams of sodium bicarbonate and the mixture refluxed for two hours. The solution was then diluted with cold water and ice and made acid with dilute sulphuric acid. The 11-mercaptyl undecanoic acid was separated by filtration and further purified by recrystallization from heptane. This purified acid had a melting point of 38° C. and was substantially pure 11-mercaptyl undecanoic acid containing a very slight amount of 10-mercaptyl undecanoic acid. This acid was then esterified with ethyl alcohol to form ethyl 11-mercaptyl undecanoate.

Alternatively, my polymerization regulator was also prepared by passing hydrogen bromide through a solution of about 20 grams of the ethyl ester of undecanoic acid in 250 cc. of benzene containing 5 drops of hydrogen peroxide. This solution was then washed thoroughly with water and twice with a concentrated sodium bicarbonate solution and finally with salt water. The solution of ethyl 11-bromo undecanoate containing a relatively small amount of ethyl 10-bromo undecanoate was dried over sodium sulfate. The benzene was removed by distillation and the crude ester distilled at 1 mm. pressure. The crude ester was fractionated and that fraction boiling at 128 to 134° C. at 1 mm. pressure was converted to a mixture of ethyl 11-mercaptyl undecanoate and ethyl 10-mercaptyl undecanoate. This conversion was effected by dissolving 80 grams of the ethyl bromo undecanoate, 20.8 grams of thiourea, and 5 drops of concentrated ammonium hydroxide in 125 cc. of ethyl alcohol. This solution was refluxed for 3 hours and 39.6 grams of sodium bicarbonate dissolved in 150 cc. of water was then added and refluxing continued for 30 minutes. The upper layer was separated and the lower layer was acidified with sulphuric acid and extracted 3 times with 20 cc. portions of benzene. The upper layer and the benzene extracts were combined and washed twice with salt water and dried over sodium sulfate. After removal of the benzene by distillation, the mercaptyl ester was distilled at 119 to 126° C. at 1 mm. pressure to purify the ester. The resulting ester was actually a mixture of ethyl 11-mercaptyl undecanoate and ethyl 10-mercaptyl undecanoate with the first mentioned ester predominating. The product of this second process contained a relatively larger amount of ethyl 10-mercaptyl undecanoate than the ester prepared according to the first process.

The following examples serve to illustrate the use of my polymerization regulators without limiting them to the particular proportions or ingredients.

*Example 1*

A synthetic rubber-like material was prepared as follows:

150 parts isoprene
20 parts alpha-methyl-para-methyl-styrene
30 parts acrylonitrile
300 parts water
10 parts sodium stearate (emulsifying agent)
1 part polymerization regulator
1 part potassium persulfate (polymerization catalyst)

This polymerization regulator was substantially pure ethyl 11-mercaptyl undecanoate prepared as set forth in the first-mentioned process.

The emulsion was shaken for five days at 25 to 30° C. The emulsion was coagulated with dilute acetic acid and the product in a yield of over 90% was a plastic, easily milled material comparable to unvulcanized natural rubber. This product may be compounded and vulcanized in the usual manner.

*Example 2*

A synthetic rubber-like material was prepared as follows:

180 parts butadiene-1.3
60 parts styrene
295 parts water
12 parts sodium stearate
0.1 parts sodium hydroxide
1.2 parts potassium persulfate
1.2 parts polymerization regulator The sodium hydroxide was for the purpose of placing the emulsion on the alkaline side. The polymerization regulator was a mixture of ethyl 11-mercaptyl undecanoate and ethyl 10-mercaptyl undecanoate prepared according to the second process hereinbefore described. The first-mentioned ester predominated in the regulator.

The emulsion was shaken for seven days at about 25° C. and then coagulated with acetic acid. The product was comparable to unvulcanized natural rubber and was more plastic than the usual butadiene-styrene (Buna S) synthetic rubber. This product may be vulcanized in the usual manner.

*Example 3*

A synthetic rubber-like material was prepared as follows:

1200 parts isoprene
1800 parts water
36 parts sodium stearate
6 parts ethyl 11-mercaptyl undecanoate
6 parts potassium persulfate
0.6 part sodium hydroxide The emulsion was shaken for 48 hours at a temperature of 38° C. to 40° C. and then coagulated with dilute acetic acid. The product was rubber-like, similar to unvulcanized natural rubber, relatively plastic and readily millable.

In general, my polymerization regulators produce tackier and more cohesive synthetic rubber-like materials and their use results in higher yields.

Having described my invention in detail, it is obvious that various modifications may be made therein and that some features may be employed without others, all without departing from the spirit or scope of my invention which is defined in the appended claims.

I claim:

1. The process which comprises polymerizing a material selected from the group consisting of an open chain, aliphatic conjugated diene containing 4 to 6 carbon atoms and a mixture of such a conjugated diene with a different copolymerizable compound containing a vinyl radical in an aqueous emulsion in the presence of a polymerization regulator selected from the group consisting of alkyl 11-mercaptyl undecanoate, alkyl 10-mercaptyl undecanoate, and a mixture of alkyl 11-mercaptyl undecanoate and alkyl 10-mercaptyl undecanoate, said alkyl radical having 1 to 4 carbon atoms inclusive.

2. The process which comprises polymerizing an open chain, aliphatic conjugated diene containing 4 to 6 carbon atoms and styrene in an aqueous emulsion in the presence of a polymerization regulator selected from the group consisting of alkyl 11-mercaptyl undecanoate, alkyl 10-mercaptyl undecanoate, and a mixture of alkyl 11-mercaptyl undecanoate and alkyl 10-mercaptyl undecanoate, said alkyl radical having 1 to 4 carbon atoms inclusive.

3. The process which comprises polymerizing an open chain, aliphatic conjugated diene containing 4 to 6 carbon atoms and acrylonitrile in an aqueous emulsion in the presence of a polymerization regulator selected from the group consisting of alkyl 11-mercaptyl undecanoate, alkyl 10-mercaptyl undecanoate, and a mixture of alkyl 11-mercaptyl undecanoate and alkyl 10-mercaptyl undecanoate, said alkyl radical having 1 to 4 carbon atoms inclusive.

4. The process which comprises polymerizing butadiene-1,3, and a copolymerizable compound containing a vinyl radical in an aqueous emulsion in the presence of a polymerization regulator selected from the group consisting of alkyl 11-mercaptyl undecanoate, alkyl 10-mercaptyl undecanoate, and a mixture of alkyl 11-mercaptyl undecanoate and alkyl 10-mercaptyl undecanoate, said alkyl radical having 1 to 4 carbon atoms inclusive.

5. The process which comprises polymerizing isoprene and a copolymerizable compound containing a vinyl radical in an aqueous emulsion in the presence of a polymerization regulator selected from the group consisting of alkyl 11-mercaptyl undecanoate and alkyl 10-mercaptyl undecanoate, and a mixture of alkyl 11-mercaptyl undecanoate and alkyl 10-mercaptyl undecanoate, said alkyl radical having 1 to 4 carbon atoms inclusive.

6. In the process of polymerizing an open chain, aliphatic conjugated diene containing 4 to 6 carbon atoms in an aqueous emulsion, the step of effecting the polymerization in the presence of a polymerization regulator selected from the group consisting of alkyl 11-mercaptyl undecanoate, alkyl 10-mercaptyl undecanoate, and a mixture of alkyl 11-mercaptyl undecanoate and alkyl 10-mercaptyl undecanoate, said alkyl radical having 1 to 4 carbon atoms inclusive.

7. In the process of polymerizing butadiene-1,3, in an aqueous emulsion, the step of conducting the polymerization in the presence of a polymerization regulator selected from the group consisting of alkyl 11-mercaptyl undecanoate, alkyl 10-mercaptyl undecanoate, and a mixture of alkyl 11-mercaptyl undecanoate and alkyl 10-mercaptyl undecanoate, said alkyl radical having 1 to 4 carbon atoms inclusive.

8. The process which comprises polymerizing a material selected from the group consisting of an open chain, aliphatic conjugated diene containing 4 to 6 carbon atoms and a mixture of such a diene with a different copolymerizable compound containing a vinyl radical in an aqueous emulsion in the presence of a polymerization regulator selected from the group consisting of alkyl 11-mercaptyl undecanoate, alkyl 10-mercaptyl undecanoate, and a mixture of alkyl 11-mercaptyl undecanoate and alkyl 10-mercaptyl undecanoate, said alkyl radical having 1 to 4 carbon atoms inclusive, said regulator being present in an amount less than 1% by weight based on the total weight of monomeric polymerizable material.

9. The process which comprises polymerizing butadiene-1,3 and styrene in an aqueous emulsion in the presence of ethyl 11-mercaptyl undecanoate and ethyl 10-mercaptyl undecanoate.

KARL H. WEBER.

REFERENCES CITED

The following references are of record in the file of this patent:

UNITED STATES PATENTS

| Number | Name | Date |
|---|---|---|
| 2,378,030 | Olin | June 12, 1945 |
| 2,402,644 | Lazier et al. | June 25, 1946 |